United States Patent [19]

Brown et al.

[11] Patent Number: 5,052,741
[45] Date of Patent: Oct. 1, 1991

[54] SIDE RAILS FOR ALUMINUM TRUCK BODY

[75] Inventors: Raynard Brown, Dana Point; Norval L. Lopshire, Santa Fe Springs, both of Calif.

[73] Assignee: Brownell Truck Bodies, Inc., Santa Fe Springs, Calif.

[21] Appl. No.: 567,605

[22] Filed: Aug. 15, 1990

[51] Int. Cl.⁵ ............................................. B62D 25/02
[52] U.S. Cl. ................................... 296/191; 296/181; 296/183; 52/282; 52/588
[58] Field of Search ....................... 296/181, 183, 191; 52/282, 588, 241

[56] References Cited

U.S. PATENT DOCUMENTS

| 3,760,548 | 9/1973 | Sauer et al. | 52/588 X |
| 3,815,311 | 6/1974 | Nisula et al. | 52/588 |
| 3,886,705 | 6/1975 | Cornland | 52/588 |
| 4,104,837 | 8/1978 | Naito | 52/282 |
| 4,222,606 | 9/1980 | Brown et al. | 296/183 |
| 4,954,844 | 9/1990 | Hancock | 296/181 X |

Primary Examiner—Robert R. Song
Attorney, Agent, or Firm—Edgar W. Averill, Jr.

[57] ABSTRACT

An aluminum side rail for use in fabricating the side walls of a truck body. The rail has a hollow, rectangular central section with a pair of upwardly extending longitudinal arms with outwardly facing tabs. At the bottom edge of the rectangular section are a pair of downwardly facing arms that have inwardly facing tabs, and the top arms hold the bottom arms of an adjacent rail. An aggregation of arms are joined together side-to-side to form the side wall of a truck body.

2 Claims, 1 Drawing Sheet

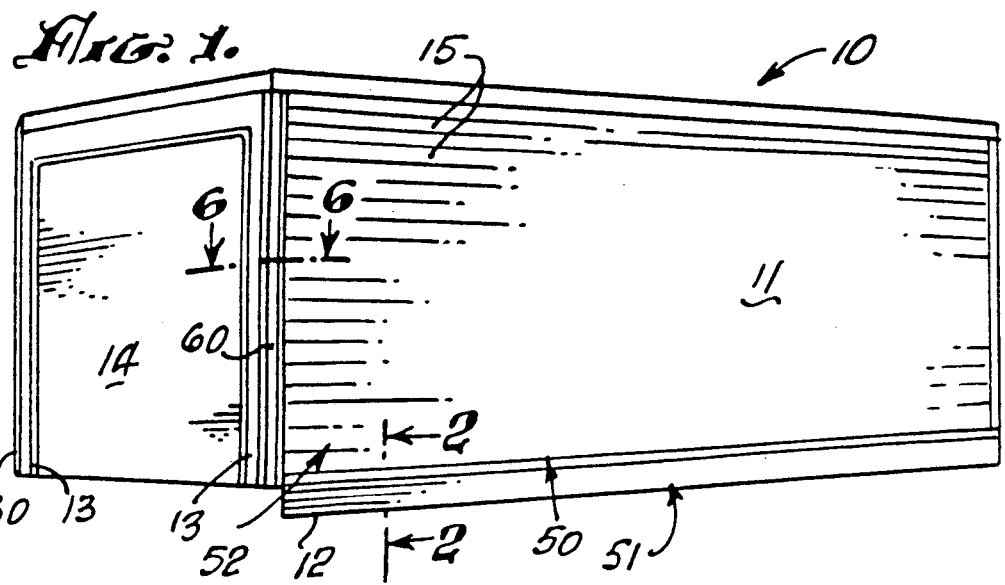
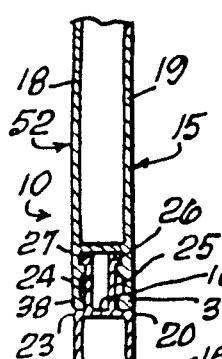
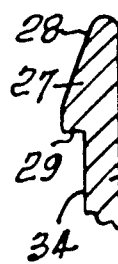
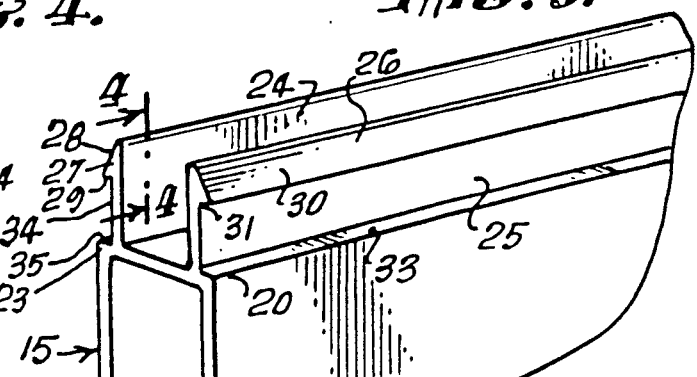
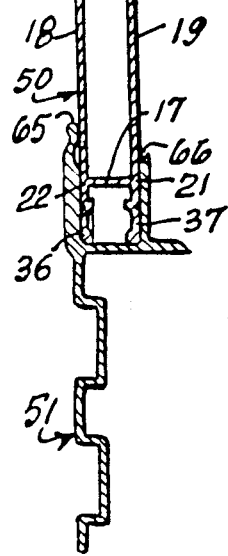
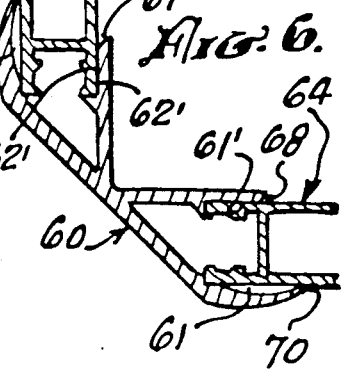

SIDE RAILS FOR ALUMINUM TRUCK BODY

BACKGROUND OF THE INVENTION

The field of the invention is structural members, and the invention relates more particularly to truck body construction.

The side wall of truck bodies is generally formed from plywood with an aluminum or plastic exterior surface. One such construction is shown in applicant's U.S. Pat. No. 4,222,606 which shows a truck body made of plywood panels joined at their vertical intersection by aluminum, panel-joining rails having an inner recess for a caulking compound. An extruded structural system is disclosed in U.S. Pat. No. 4,557,091. U.S. Pat. No. 4,084,272 shows a plastic extrusion used in swimming pools. An overflow gutter system is shown in FIG. 7, but in both of these patents, there is not a sufficient protection against bending between adjacent rails. The constructions shown in these two patents would not be satisfactory for a side wall made of many horizontal rails.

With the ever increasing interest in fuel economy, there is a need for truck body sidewalls of lighter weight. Also, for some applications, such as the transportation of oxygen, it is important to have a nonflammable truck body built from material that will not burn.

SUMMARY OF THE INVENTION

It is an object of the present invention to provide a lightweight, nonflammable truck body side wall construction.

The present invention is for an aluminum side rail for use in fabricating the side walls of a truck body. Each rail has an elongated, hollow, rectangular central section including a top edge, a bottom edge, an outer edge, an inner edge and four exterior corners. A pair of upwardly extending arms extend lengthwise along the top edge of the rectangular central section. Each arm is spaced near to, but inwardly, from the two exterior corners of the top edge, and each arm has outwardly facing elongated tabs. A pair of downwardly extending arms extend lengthwise along the bottom edge of the hollow, rectangular central section. Each downwardly extending arm has an elongated, inwardly facing tab, which tabs mate with the upwardly extending arms of an adjacent rail. Thus the side wall may be built by sliding a plurality of rails, one above the other to form a lightweight, nonflammable truck body side wall.

BRIEF DESCRIPTION OF THE DRAWINGS

FIG. 1 is a perspective view of a truck body including the aluminum side rail of the present invention.

FIG. 2 is a cross-sectional view taken along line 2—2 of FIG. 1.

FIG. 3 is an enlarged perspective view of the end of one of the side rails of the side wall of the truck body of FIG. 1.

FIG. 4 is an enlarged cross-sectional view taken along line 4—4 of FIG. 3.

FIG. 5 is an enlarged cross-sectional view taken along line 5—5 of FIG. 3.

FIG. 6 is an enlarged cross-sectional view taken along line 6—6 of FIG. 1.

DESCRIPTION OF THE PREFERRED EMBODIMENTS

A truck body is shown in perspective view in FIG. 1 and indicated generally by reference character 10. Truck body 10 has a plurality of aluminum side rails 11, a bottom side rail 12, corner rails 13 and a rear door 14.

One of the individual rails of the plurality of aluminum side rails 11 is shown in FIG. 3 and indicated by reference character 15. Side rail 15 has an elongated, hollow, rectangular central section which includes a top edge 16, a bottom edge 17, an outer edge 18 and an inner edge 19. The rectangular central section also has four exterior corners 20, 21, 22 and 23. A pair of upwardly extending arms 24 and 25 extend lengthwise along top edge 16. Arms 24 and 25 are spaced near to, but inwardly, from exterior corners 20 and 23. Arms 24 and 25 each have outwardly facing, elongated tabs 26 and 27. Tab 27 has a slanted face 28 and a step 29. Similarly, Tab 26 has a slanted face 30 and a step 31. Upwardly-extending arm 25 has a vertical portion 32 which terminates at top edge 16 to leave a bottom ledge 33. Similarly, upwardly extending arm 24 has a vertical portion 34 which terminates at top edge 16 to leave a bottom ledge 35.

A pair of downwardly extending arms 36 and 37 extend downwardly from the corners 21 and 22 of bottom edge 17. Downwardly extending arm 36 extends downwardly from exterior corner 22 of bottom edge 17 and has an elongated, inwardly facing tab 38 and a base 39. Inwardly facing tab 38 has a slanted face 40 and a step 41. Similarly, downwardly extending arm 37 has an inwardly facing tab 42 which likewise has a slanted face 43 and a step 44. Groove 45 is formed in the outer face of side rail 15 and, similarly, a groove 46 is formed in the inner face of side rail 15 at the outer surface of downwardly extending arm 36. These grooves form a decorative feature of the finished truck body and also provide a guide for drilling through the side at a preferred, strong location. Such drilling is used for affixing fasteners and the like at the interior of the body.

Adjacent rails are joined to form a structure of the type shown in FIGS. 1 and 2. In FIG. 2, the lowermost rail 50 is held in a base rail 51 of the type shown and described in applicant's U.S. Pat. No. 4,222,606. The next lowermost rail 52 is slid lengthwise so that its upwardly extending arms 24 and 25 fit within the downwardly extending arms 36 and 37 of next lowermost rail 52. The step 29 is adjacent the step 41 of inwardly facing tab 38 which holds the two rails together. Similarly, the bottom ledge 35 supports an additional amount of the weight through contact with base 39 of downwardly extending arm 38. Similarly, base 44 contacts bottom ledge 33 as step 44 contacts step 31 to securely hold the two rails together. An adhesive is placed between the lowermost rail and the base rail to secure the lowermost rail to the base rail. Beads of a sealant of the type sold under the trademark "SILAPRENE" is used on the intersection 65 between the lowermost rail and the base rail on the outer surface and at the intersection 66 on the inner surface.

The corner of the truck body 10 is formed by corner piece extrusion 60 which is of the type shown in applicant's U.S. Pat. No. 4,222,606. An adhesive is also used at 61, 61', 62 and 62' to secure corner piece extrusion 60 to rails 63 and 64. Also, beads of sealant are used at 67, 68, 69 and 70. The resulting truck body is very light in weight and also completely fireproof. It may be quickly and economically assembled, either by longitudinally sliding them together or vertically snapping them together, and needs no painting or other surface treatment other than for decoration.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. An aluminum side rail for use in fabricating the side walls of a truck body, said rail comprising:

an elongated, hollow, rectangular central section including a top edge, a bottom edge, an outer edge, an inner edge and four exterior corners;

a pair of upwardly extending arms extending lengthwise along the top edge thereof spaced near to, but inwardly, from the two exterior corners of the top edge, and each of said upwardly extending arms having outwardly facing, elongated tabs;

a pair of downwardly extending arms extending lengthwise along the bottom edge, said downwardly extending arms being spaced apart and extending downwardly from the two exterior corners of the bottom edge, and each of said downwardly extending arms having elongated inwardly facing tabs which are spaced below the bottom edge sufficiently to mate with and securely hold the outwardly facing tabs of an identical side rail.

2. A truck body side wall made from a plurality of the rails of claim 1 positioned horizontally.

* * * * *